Aug. 29, 1967         D. H. SCHULER         3,338,594
DRAWBAR ATTACHMENT
Filed Aug. 4, 1965
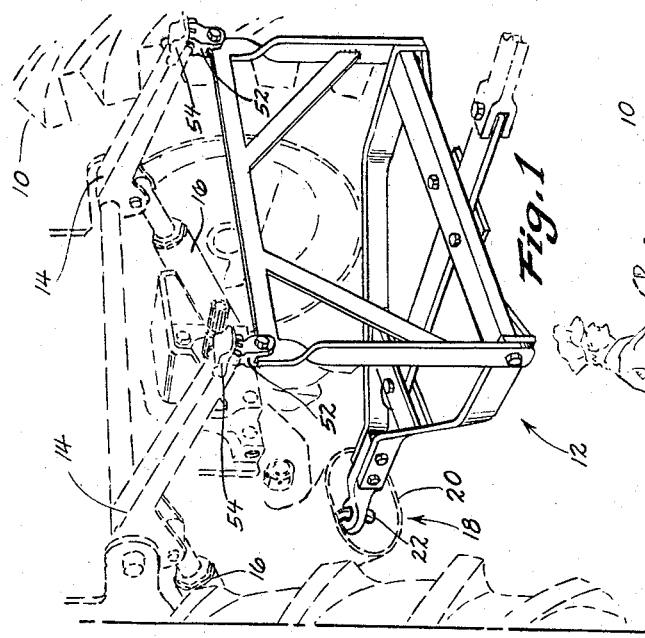
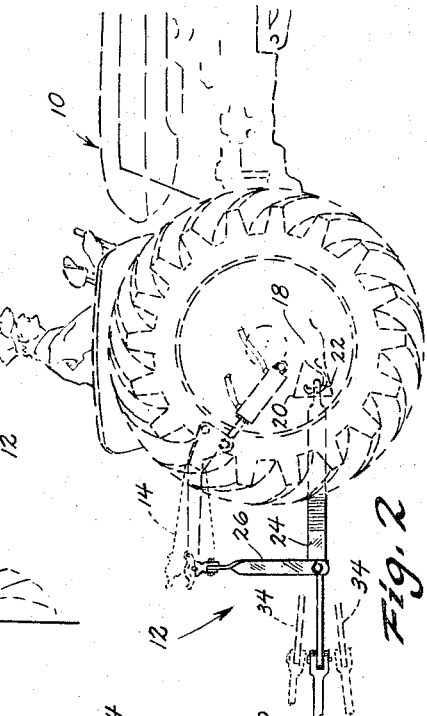
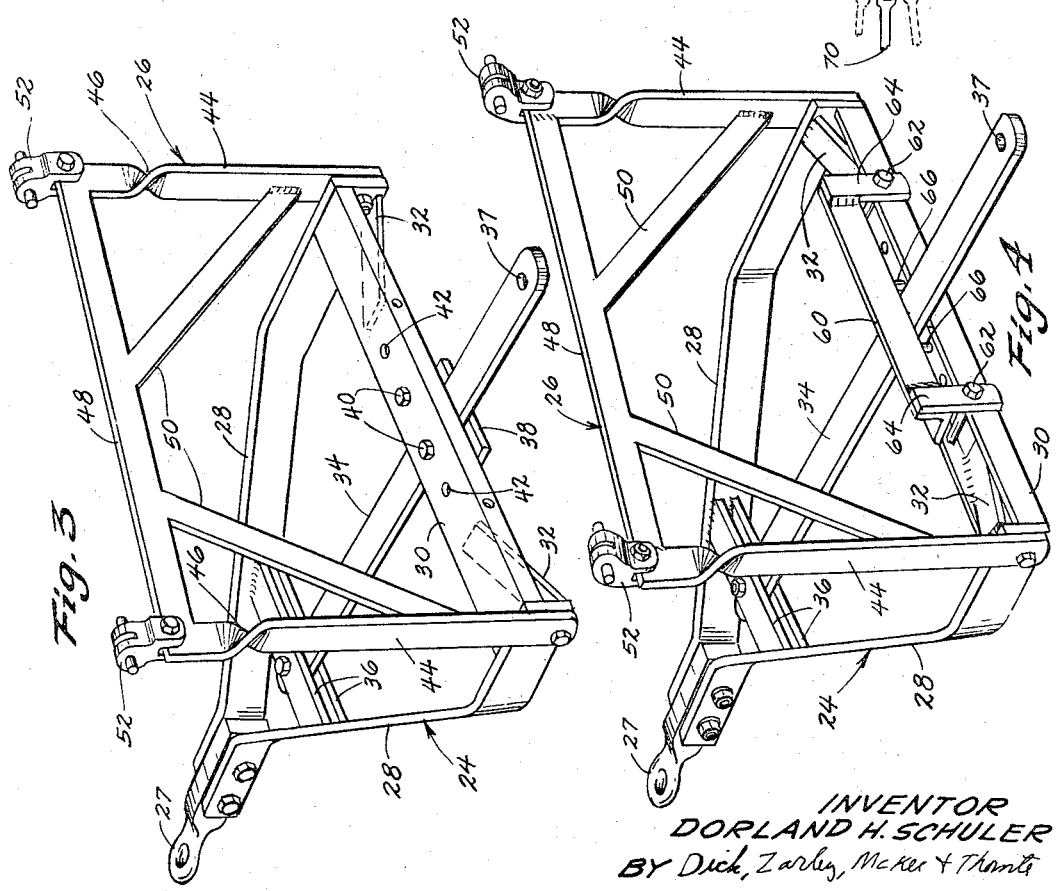
INVENTOR
DORLAND H. SCHULER
BY Dick, Zarley, McKee & Thomte
ATTORNEYS

3,338,594
DRAWBAR ATTACHMENT
Dorland H. Schuler, Griswold, Iowa 51535
Filed Aug. 4, 1965, Ser. No. 477,266
10 Claims. (Cl. 280—415)

ABSTRACT OF THE DISCLOSURE

A drawbar device including a horizontally disposed V-shaped section pivotally connected at its vertex to an anchor on a tractor below and forwardly of a pair of spaced apart lift arms which are pivotally connected to a second section which is pivotally connected to the outer free ends of the V-shaped section. A support member extends transversely of the hitch device adjacent the pivotal connection between the first and second sections.

---

A conventional drawbar on a tractor is fixed and immovable vertically. However, certain tractors have in addition to the fixed drawbar a hydraulic lift arrangement including a pair of rearwardly extending lift arms and therefore the drawbar attachment of this invention is designed to cooperate with the fixed drawbar of the tractor and the tractor's lift arms to give an adjustable drawbar which may be selectively moved to the desired vertical position.

Accordingly it is an object of this invention to provide a drawbar attachment assembly which may be quickly attached and detached from a tractor having a fixed drawbar and hydraulically operated lift arms.

It is a further object of this invention to provide a drawbar assembly which may be used as a jack for lifting farm implements or the like.

It is still a further object of this invention to provide a tractor and a drawbar assembly wherein the drawbar assembly is connected to the tractor at only three points.

A related object of this invention is to provide quick release connections at all three points where the drawbar assembly is coupled to the tractor.

A still further object of this invention is to provide a tractor with a drawbar assembly wherein the drawbar assembly is of durable design, simple and economical to manufacture.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the rear end of a tractor with the drawbar assembly of this invention mounted thereon;

FIG. 2 is a side elevation view of the tractor and the drawbar assembly mounted thereon shown in several different positions in its vertical movement;

FIG. 3 is a perspective view of the drawbar assembly only; and

FIG. 4 is a perspective view similar to FIG. 3 but of a modified drawbar assembly.

In FIG. 2 it is seen that a tractor 10 is provided with a drawbar assembly generally referred to by the reference numeral 12. The tractor 10 is provided with a pair of rearwardly extending lift arms 14 powered by hydraulic cylinders 16. The tractor is also provided with its own drawbar 18 disposed below and between the lift arms 14. It is also seen to be considerably forward of the outer ends of the lift arms 14. The drawbar on the tractor 18 is a funnel-like shield 20 and includes a quick release hook element 22 which may be operated from the driver's station on the tractor. This drawbar 18 also serves as a pivotal anchor point for the drawbar attachment 12 as hereinafter more fully described.

The drawbar attachment 12 includes a pair of sections 24 and 26 which are normally horizontally and vertically arranged respectively. The horizontal section 24 is generally V-shaped and at the base of the V-shaped section is an eye 27 for engagement with the hook 22 on the tractor drawbar 18. A pair of plate members 28 extend in a diverging relationship to the eye member 27 to thereby form the legs of the V-shaped section 24. The outer ends of the legs 28 are closed by a channel member 30 extending therebetween. A pair of reinforcing plate members 32 extend from the outer ends of the plate leg members 28 inwardly where they are welded to the inside of the channel member 30.

As seen in FIG. 3, a drawbar member 34 is provided and is pivotally connected to a pair of support plates 36 extending transversely between the legs 28 adjacent the eye member 27. The opposite end of the drawbar member 34 is positioned outwardly of the channel member 30 while the intermediate portion of the drawbar member 34 rests against the channel member 30. A drawbar pin hole 37 is provided in the outer end of the drawbar member 34. As seen in FIG. 3, a support plate 38 is bolted to the channel member 30 for engagement with the lower side of the drawbar member 34. In the arrangement of FIG. 3, the drawbar member 34 may be pivoted to various points along the channel member 30 by relocation of a pair of bolts 40 to the other holes 42 in the chamber member 30.

The vertical section 26 is generally U-shaped and has a pair of plate leg members 44 pivotally connected at their outer free ends to the outer free ends of the leg members 28 of the horizontal section 24. A twist 46 is provided in the plate members 44. A plate member 48 interconnects the upper ends of the leg members 44 and a pair of diagonally extending braces 50 extend from the base plate member 48 to the adjacent legs 44. A pair of quick release coupling elements 52 are provided on the upper corners of the vertical section 26 for releasable engagement with the cooperating coupling elements 54 on the lift arms 14 as seen in FIG. 1.

In FIG. 4 it is seen that the sections 24 and 26 have been pivoted 180 degrees relative to each other whereby the channel member 30 of the horizontal section 24 faces upwardly as compared to its position in FIG. 3 or at face downwardly. Also, the plate member 38 has been replaced by an angle iron member 60 which extends a substantial distance along the length of the channel member 30 and is secured thereto by bolts 62 bolted to leg elements 64 which in turn are welded to the angle member 60. Thus, the drawbar member 34 may pivotally move between the leg members 64 on the angle iron member 60. A pair of drop pins or bolts 66 are provided to temporarily maintain the drawbar member 34 in a desired stationary position.

Thus, in operation as seen from FIGS. 1 and 2, the drawbar attachment assembly 12 is secured at three points to the tractor 10. First, the coupling elements 52 on the upper corners of the vertical section 26 are locked in engagement with the corresponding quick release elements 54 on the outer ends of the lift arms 14. Then, the lower section 28 is pivoted upwardly such that the eye member 27 moves into locking engagement with the tractor drawbar hook element 22 disposed in the funnel shield 20. The drawbar attachment is now ready for use and by hydraulically operating the lift arms 14 the drawbar attachment assembly 12 may be lowered and raised thereby selectively positioning the drawbar member 34 carried thereon in any desired position such as illustrated in FIG.

2. An implement tongue 70 is shown connected to the drawbar member 34. It is readily apparent that not only can this drawbar attachment be used to easily couple the tractor to the tongue of an implement which is resting on the ground without first raising the tongue to the normal height of the tractor drawbar but that the drawbar attachment assembly 12 may be used for almost any type of lifting job. Moreover, it is also readily seen that the whole attachment assembly 12 may be readily removed from the tractor by simply operating the quick release coupling elements 54 on the arms 14 and the hook member 22 of the tractor drawbar 18.

Some changes may be made in the construction and arrangement of my drawbar attachment without departing from the real spirit and purpose of my invention, and it is my intention to cover by my claims, any modified forms of structure or use of mechanical equivalents which may be reasonably included within their scope.

I claim:

1. In combination, a tractor having a pair of vertically movable lift arms extending rearwardly thereof and an anchor positioned below and between said lift arms, and a detachable drawbar assembly having a first section connected at one end to said anchor and the other end positioned rearwardly below said lift arms, a second section pivotally connected at one end to the other end of said first section and the other end of said second section being pivotally connected to the outer ends of said rearwardly extending lift arms, drawbar means on the outer end of said drawbar assembly having a support member extending transversely of said first section and operatively connected to and positioned adjacent the other end of said first section.

2. The structure of claim 1 wherein said first section is substantially V-shaped with its apex being connected to said anchor and the outer ends of the legs of said V being pivotally connected to said second section.

3. The structure of claim 1 wherein said drawbar means includes an inner end and outer support means spaced apart rearwardly of said anchor, said support member being said outer support means, and an elongated member engaging said inner and outer support means and extending rearwardly of said second section.

4. The structure of claim 3 wherein said elongated member is pivotally connected to the inner support means and is selectively adjustable along the support member of said outer support means.

5. The structure of claim 1 wherein said detachable drawbar assembly is connected only at three points to said tractor, at said anchor and to said lift arms.

6. The structure of claim 5 wherein each of said three connections include detachable means for connecting said detachable drawbar assembly to said tractor.

7. The structure of claim 1 wherein the outer ends of said lift arms are positioned relative to said anchor and said first and second sections of said drawbar assembly are of such a length that said first and second sections are normally disposed in substantially horizontal and vertical planes respectively.

8. The structure of claim 1 wherein said first section is substantially V-shaped and said second section is substantially U-shaped, the vertex of said V-shaped first section being connected to said anchor and the free ends of said U-shaped second section being connected to the outer ends of the legs of said V-shaped first section.

9. The structure of claim 1 and hydraulic power means is coupled to said lift arms for raising and lowering said drawbar assembly whereby said support member of said drawbar means is pivoted about a horizontal axis extending through said connection between said anchor and said first section.

10. A detachable drawbar assembly for a tractor having a pair of horizontally rearwardly extending lift arms and an anchor means positioned below and between said arms and forwardly of the rear free ends of said arms, said drawbar assembly comprising, a substantially V-shaped section and a substantially U-shaped section, the apex of said V-shaped section being adapted to be connected to said anchor means, and the outer free ends thereof being pivotally connected to the outer free ends of said U-shaped section, a drawbar means extending transversely between and operatively connected to the outer free ends of said V-shaped and U-shaped sections adjacent said last mentioned pivotal connections.

References Cited

UNITED STATES PATENTS

| | | | |
|---|---|---|---|
| 2,392,903 | 1/1946 | Currie | 280—497 |
| 2,622,890 | 12/1952 | Moses | 280—474 X |
| 2,814,976 | 12/1957 | Tanke | 172—478 X |
| 2,973,970 | 3/1961 | Harrer et al. | 280—479 X |

LEO FRIAGLIA, *Primary Examiner.*